United States Patent [19]

Longacre, Jr. et al.

[11] Patent Number: 5,420,409
[45] Date of Patent: May 30, 1995

[54] BAR CODE SCANNER PROVIDING AURAL FEEDBACK

[75] Inventors: Andrew Longacre, Jr., Skaneateles; Robert M. Hussey, Syracuse, both of N.Y.

[73] Assignee: Welch Allyn, Inc., Skaneateles Falls, N.Y.

[21] Appl. No.: 137,640

[22] Filed: Oct. 18, 1993

[51] Int. Cl.[6] .......................... G06K 7/10; G06K 7/00; G06K 19/06
[52] U.S. Cl. ..................... 235/462; 235/436; 235/470; 235/494
[58] Field of Search ................. 235/494, 462, 470, 436

[56] References Cited

U.S. PATENT DOCUMENTS

| | | | |
|---|---|---|---|
| 4,866,257 | 9/1989 | Ellott et al. | 235/436 |
| 5,034,598 | 7/1991 | Poland | 235/462 X |
| 5,235,167 | 8/1993 | Dvorkis et al. | 235/462 |
| 5,243,655 | 9/1993 | Wang | 235/462 |

FOREIGN PATENT DOCUMENTS

| | | | |
|---|---|---|---|
| 0385478 | 9/1990 | European Pat. Off. | 235/462 |
| 439682A2 | 10/1990 | European Pat. Off. | |
| 0040980 | 2/1988 | Japan | 235/462 |
| 0036489 | 2/1990 | Japan | 235/462 |
| 5012480 | 1/1993 | Japan | 235/462 |

*Primary Examiner*—John Shepperd
*Assistant Examiner*—Michael G. Lee
*Attorney, Agent, or Firm*—Harris Beach & Wilcox

[57] ABSTRACT

A method is disclosed for the reading graphical indicia that are encoded in accordance with a multidimensional symbology. The indicia are repeatedly scanning a signal representative of a pattern thereof until sufficient information is recognized to assure a valid reading operation. The signal, or a memorized representation thereof is decoded to obtain character information from code words of the indicia. A first value is assigned to each newly recognized character, and a second value is assigned to each character that was recognized in a preceding scan of the indicia. The first and second values are respectively cumulated into first and second sums. A function of the first sum and the second sum is computed, an audible click produced whenever a predetermined value of the function has been attained. The first and second sums are then reset. The rate of clicks informs the user of the progression of the reading operation. An auxiliary audible indicator, such as pitch, can be varied to inform the user of the cumulative progress of the scan.

7 Claims, 8 Drawing Sheets

BAR CODE SCANNER PROVIDING AURAL FEEDBACK

BACKGROUND OF THE INVENTION

1. Field of the Invention

This invention relates to bar code scanning devices. More particularly this invention relates to bar code scanners adapted to read multidimensional bar code and graphical symbologies wherein large quantities of information are embedded in a symbol being read. Using such symbologies substantial time may be required to scan and decode the information, and the invention provides a useful indicator to the user of the scanner's progress toward successful completion of a scanning operation.

2. Description of the Prior Art

It is now common practice to provide an aural indicator upon completion of a bar code scanning operation. In the case of multidimensional bar code reading, the reading operation takes substantially longer than in one-dimensional bar code symbols. In practice several seconds can be required to complete a scan. Some aural indication of scanning progress would be extremely useful. The early forms of two-dimensional bar codes were "stacked" symbologies, and extra short beeps have been inserted upon completion of successful row reads to inform the operator. Such beeps are distracting, and eventually become irritating to the user. This cacophonous approach to informing the user has not achieved wide acceptance in the art.

Newer bar code symbologies, such as PDF417, are characterized by redundant information for purposes of reading accuracy. Consequently it is possible to decode a PDF417 code without scanning the entire symbol. Furthermore, PDF417 contains indicators of the number of rows, the number of data elements in each row, and the degree of redundancy of data. The last characteristic is also known as the security level, which in PDF417, can vary from 0 (no redundancy) to a maximum value of 8. It is thus possible for the scanner to determine the minimum number of code words needed to be decoded in order to evaluate all the encoded information in the symbol, and to measure its progress during the scan.

The specification of PDF417 is known to the art and is disclosed, for example in U.S. Pat. No. 5,243,655, incorporated herein by reference, and in European Patent Application EP 0 432 682. Briefly summarized, PDF417 is a two dimensional (17,4) symbology, a specialization of the (n,k) family of bar codes. In PDF417 a code word comprises 17 bits comprising 4 runs of bars and 4 runs of spaces in differing combinations, which produces a large number of legal patterns. Each space and each bar can vary in width from 1 to 6 arbitrary units, so long as the total number of units in the codeword is 17. Three mutually exclusive subsets or clusters of the set of legal patterns are used in PDF417, each cluster containing 929 code words. Each of the 929 code words can be ordered in a t-sequence, and the patterns in the t-sequences can be mapped to a desired alphabet by suitable translation tables.

Each row of a PDF symbol comprises code words selected from one of the three clusters, and there is a periodic rowwise usage of the three subsets. It is possible to identify the particular cluster to which a codeword belongs by computing a discriminator function:

$$f(X) = (x_1 - x_3 + x_5 - x_7) \mod 9$$

where X is the mark pattern of the codeword; $x_1$, $x_3$, $x_5$, and $x_7$ represent the width of bars in the pattern; and $x_2$, $x_4$, $x_6$, and $x_8$ represent the widths of spaces. While 9 clusters are possible, only three are actually used in PDF417, clusters 0, 3, and 6.

In each row of a PDF symbol there is a start pattern, a left row indicator code word, data code words, a right row indicator code word, and a stop pattern. Error correction information may be included in the data code words. The row indicator code words contain information about the organization of the symbol, specifically the row number, the number of rows in the symbol, number of data columns and the security level. Not all of this information is contained in every row indicator code word; instead the information is distributed in a pattern which repeats every three rows.

During a scanning operation the scanner can identify the cluster of a particular codeword, and hence its row identifier modulo 3. This local row identification is particularly useful when the scanning axis is not perfectly aligned with the rows of the symbol, and a transition between two rows occurs during a scanning operation. Detection of row crossing permits "scan stitching"—a mapping of partial row scans into a matrix or memory. Missing pieces in the partially completed matrix can be filled in by other scanned data, possibly from entirely different rows, either because the data is redundantly expressed in the symbol, or with the use of error correction algorithms such as Reed-Solomon codes.

Reading a PDF417 code can be conducted in a known manner on a character-by-character basis in accordance with a two step process. In the first step a code word is scanned and its discriminator function computed. The first step is completed by identifying the cluster of a codeword and determining the value of the t-sequence for the identified cluster. In a second step, or high level decoding, the member of the alphabet that was encoded in the symbol is derived from the value of the t-sequence, using look-up tables or similar.

As some information on a symbol being scanned may not be satisfactorily decoded after a first pass, it is common for the scanner to make repetitive passes before a valid read operation has been accomplished.

SUMMARY OF THE INVENTION

It is therefore a primary object of the present invention to provide a pleasant and nondistracting audible indication to the operator of a scanner of bar code symbols and graphical indicia of the rate of progress of a scanning operation.

It is a further object of the present invention to provide a secondary aural indication of the cumulative progress of a scanning operation.

It is another object of tile present invention to provide an aural indication of the rate of progress of a scanning operation, the indication having a first value when previously unrecognized information is scanned and a second value when known information is scanned.

These and other objects of the present invention are attained by a method of reading bar code and graphical indicia of the type having data units encoded therein, comprising the steps of: scanning indicia to acquire a representation thereof; decoding data units encoded within the representation; and while the step of decoding is being performed, producing an audible indicator whenever a value that is calculated as a function of a predetermined number of decoded data units has been attained; successive audible indicators defining intervals therebetween. The data units can comprise characters, code words, or similar. The audible indicators and the intervals inform a user of progress in completing a reading operation. The function can be an increasing or decreasing function. As used herein the term "attained" has the meaning of equaling or exceeding in the case of an increasing function, and of failing to equal or exceed in the case of a decreasing function.

In accordance with one aspect of the invention, the audible indicator comprises a click.

In accordance with another aspect of the invention repetitive scans of the indicia are performed to obtain successive representations thereof. Data units contained in successive representations are decoded and each is assigned to one of a first group comprising data elements that have been decoded from a previous representation, and a second group comprising data elements that have not been decoded from any previous representation. The function comprises a function of decoded data elements in the first group and of decoded data elements in the second group. The audible indicators thus recur at a first rate when previously decoded data elements are decoded and at a second rate when previously undecoded data elements are being decoded.

In accordance with another aspect of the invention the indicia have encoded therein an indicator sufficient to allow a determination of a total number of data units in the indicia, and the audible indicator has an auxiliary audible characteristic, which can be a tone or pitch. While decoding is being performed, determining the number of undecoded data elements in the indicia is determined. The auxiliary audible characteristic is varied in accordance with the quantity of undecoded data elements, so that the user is informed of cumulative progress in the reading operation.

The invention involves the reading graphical indicia that are encoded in accordance with a multidimensional symbology, the symbology having code words defined therein. This is accomplished by repeatedly scanning the indicia to produce a signal representative of a pattern thereof at least until sufficient information is recognized to assure a valid reading operation. The signal, or a memorized representation thereof is decoded to obtain character information from code words of the indicia. A first value is assigned to each newly recognized character, and a second value is assigned to each character that was recognized in a preceding scan of the indicia. The first and second values are respectively cumulated into first and second sums. A function of the first sum and the second sum is computed, an audible click produced whenever a predetermined value of the function has been attained. The first and second sums are then reset.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE PREFERRED EMBODIMENT

Figure 1:
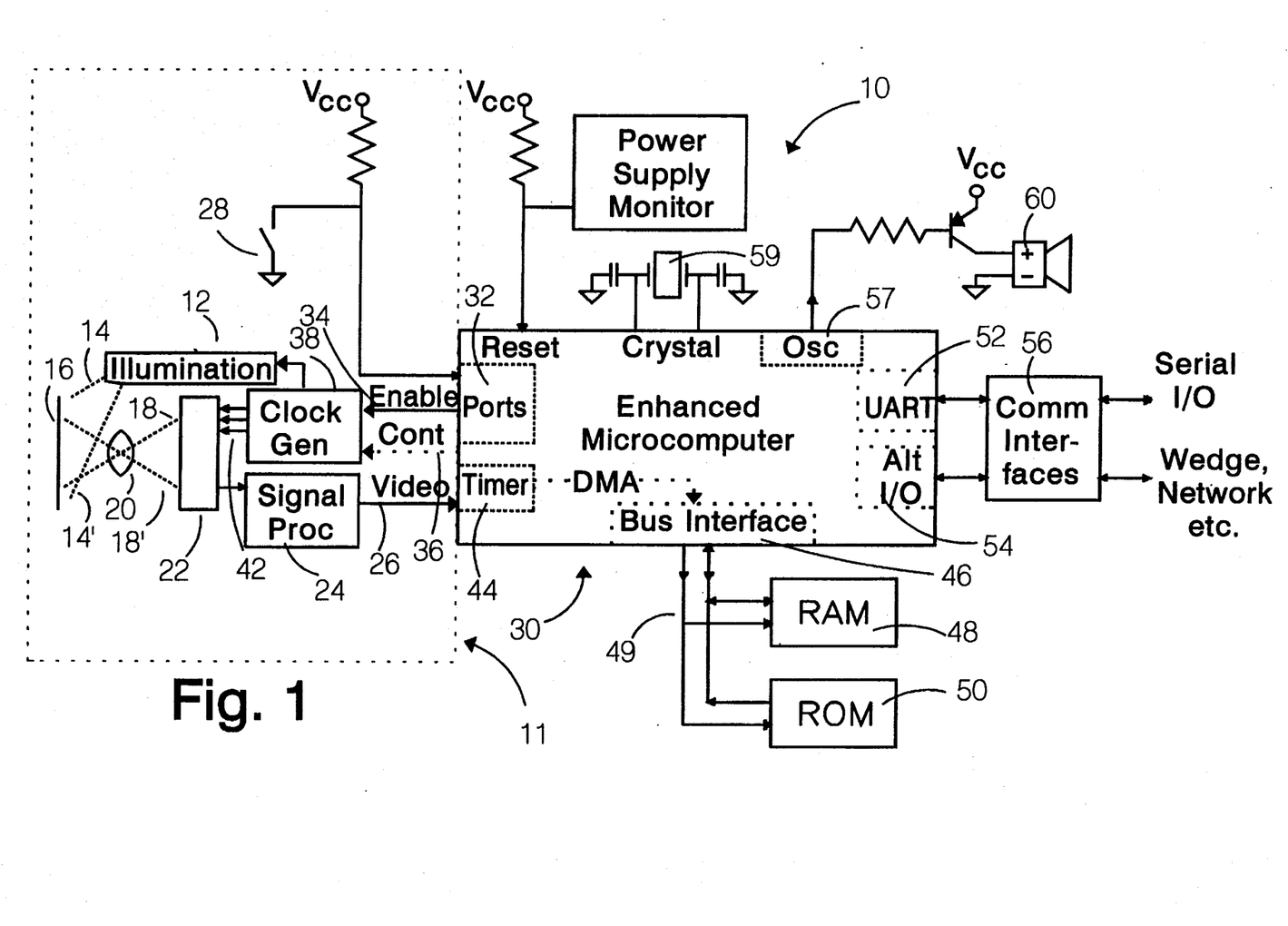
FIG. 1 is a block diagram of an apparatus in accordance with the present invention.

Turning now to the drawings, there is shown in FIG. 1 a block diagram of a system 10 that embodies the teachings of the present invention. System 10 includes a scanning section 11, which is enclosed by the dotted line at the left side of FIG. 1, Illuminator 12, which can be an LED array, a laser, or similar produces a light beam represented by outer defining rays 14, 14'. The beam strikes a target 16 on which are found graphical indicia, which can be PDF417 symbols. The light beam is reflected through optics 20, the reflected beam being shown representatively as rays 18, 18'. The optics project an image of the indicia onto image sensor 22, which is preferably realized as a CCD array or matrix. Signals developed by the image sensor 22 responsive to light incident thereon are conducted through signal processing electronics 24, and a suitably conditioned video signal 26 is presented to an enhanced microcomputer 30.

Operation of the scanning section 11 is controlled by a trigger 28, which can be a manual trigger, or an automatic trigger that responds to the presence of indicia. The trigger 28 is coupled to the microcomputer 30 via an I/O port section 32. The microcomputer 30 asserts an enable signal 34 responsive to the trigger 28 to turn on the illuminator 12 and the image sensor 22. Control signals 36 are provided for clock generators 38 that provide suitable enabling signals for the illuminator 12, and clock signals 42 for the image sensor 22 as are required for the operation of a CCD device.

It should be understood that while this invention is explained with reference to PDF417, it is not limited thereto, and can be practiced with other symbologies.

The microcomputer is provided with a timer and DMA controller 44. The video signal is conducted through a bus interface 46 onto bus 49, and then stored as data at an address in a RAM 48, the transfer mediated by the DMA controller 44. The stored data is representative of the optical pattern of the indicia on the target 16. While DMA access to the RAM is preferred for rapidity of operation, other memory addressing techniques can be also used. Other conventional provisions include a UART 52 and an auxiliary I/O port section 54 for connecting communications devices (not shown) to the scanner, such as a keyboard when the scanner is employed in a wedge configuration, a telecommunications network, and other devices as may be required for a given application of the system.

The microcomputer 30 decodes the data in RAM 48 while scanning of the target is proceeding. It is frequently necessary to repetitively scan the target having a high information density, as a fully valid read may not be achieved on an initial pass. As valid data is read, the microcomputer 30 periodically enables an audible annunciator 60 to inform the operator of the progress of the scan. The annunciator is programmed to emit a click of short duration, having a duration of approximately 200 microseconds, the frequency of the clicking providing a nondistracting indication of the rapidity of the scanning process.

A ROM 50 contains system programs, and may also contain a program for decoding the data stored in the RAM 48. Of course the program could equivalently reside in RAM 48, and be loaded therein from a secondary memory storage (not shown), or via communications interface 56.

Figure 2:
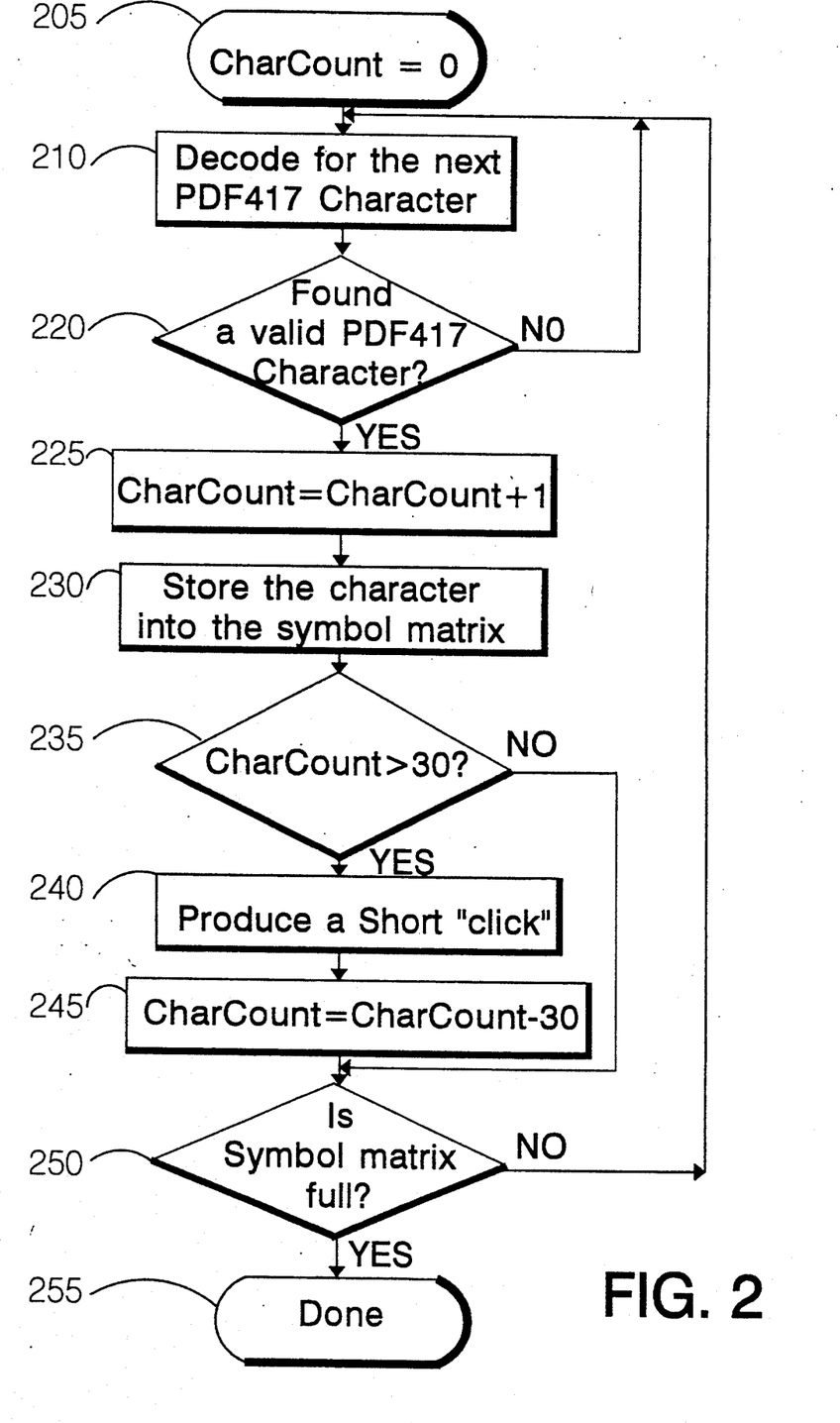
FIG. 2 is a flow chart illustrating a method of generating aural feedback in accordance with an the invention.

In FIG. 2 there is shown a flow diagram that explains the operation of a preferred embodiment of the invention, which will now be explained with reference to the system of FIG. 1, and an annunciator circuit shown in FIG. 5.

As discussed above, PDF417 provides information about the organization of a symbol being read in row indicator code words. When the target 16 is scanned, the decoding program detects a row indicator code word and defines a symbol matrix in RAM 48 by any suitable memory management technique, appropriately dimensioned to receive the anticipated number of decoded characters. When the symbol matrix is filled by the characters, the decoding process is complete, and the decoded character information can then be transferred out of the RAM 48 to a communications device via bus 49 and communications interface 56.

At the top of FIG. 2, a counter, CharCount, is initialized to zero at step 205. Data scanned from the target 16 is decoded by the microcomputer 30 at step 210. A determination is made at step 220 whether the decoded data constitutes a valid PDF417 character. If not, then step 210 is repeated.

If a valid character has been decoded in step 220, then at step 225 the counter CharCount is incremented, and the decoded character stored in the symbol matrix at step 230. The definition of the PDF417 symbology allows a mapping between the position of each code word on the symbol being scanned and an address in the symbol matrix. An association is made by the microcomputer 30 between each decoded character and the location of its encoded data on the symbol. Thus each decoded character is stored at an appropriate address in the symbol matrix.

The value of CharCount is tested at step 235. If the value of CharCount is at least 30, then ON/OFF signal 532 (see FIG. 5) is asserted by the microcomputer 30, enabling an annunciator 530 to emit a Short click at step 240. CharCount is decremented by 30 at step 245.

After decrementing CharCount, or in the event that the test at step 235 was negative, whichever may apply, the status of the symbol matrix is tested at step 250. If the symbol matrix is full, then the process is determined to be complete at step 255. Otherwise step 210 is repeated to decode yet another PDF character.

It will be apparent that a click will be emitted every 30 valid characters. The constant 30 can be varied in accordance with user preference, the information density in a symbol, or to comport with the particular hardware being used. The rate at which clicks are perceived by the operator is a measure of the rapidity of progress in completing the reading operation.

Figure 3A:
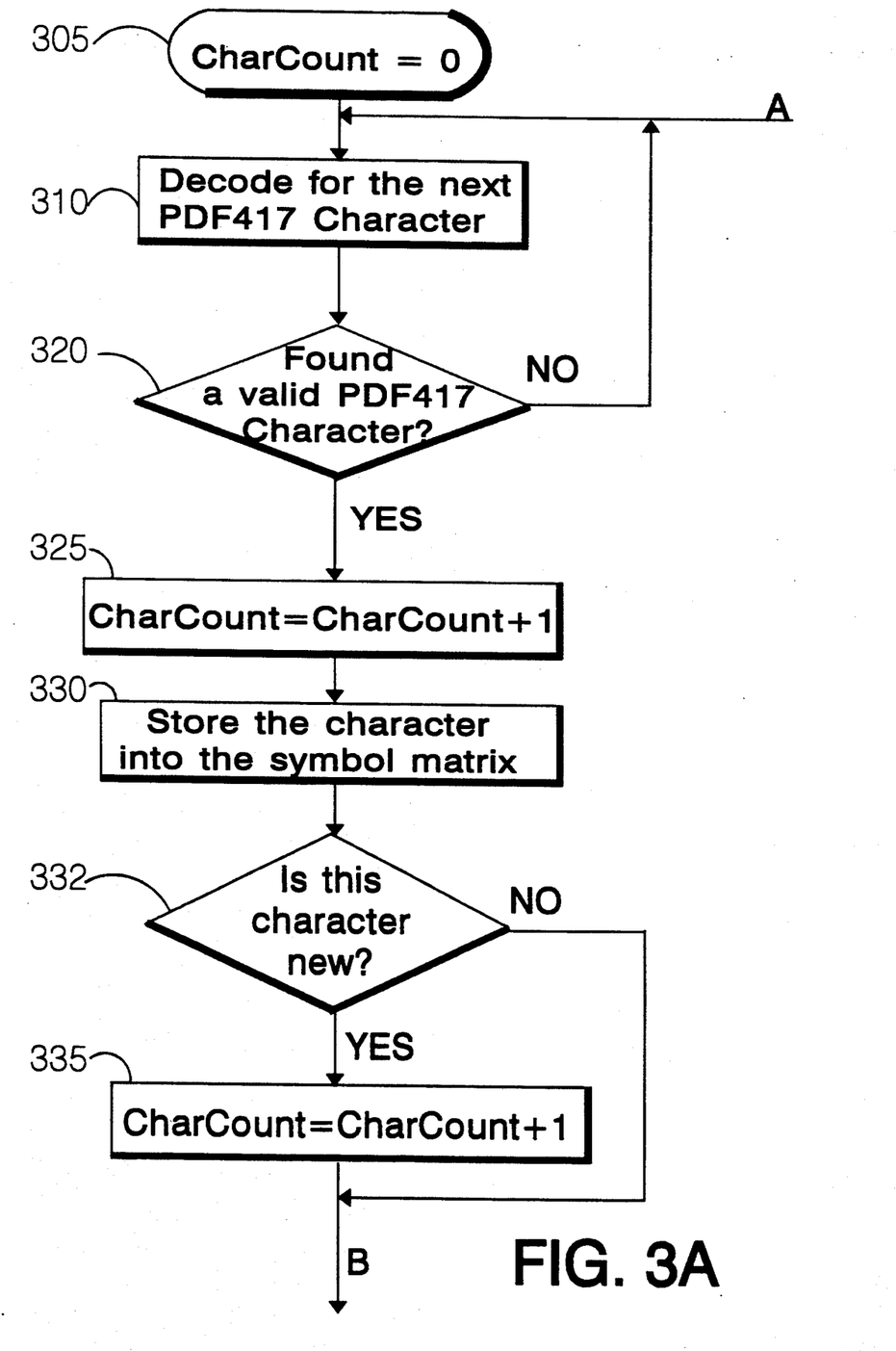
FIGS. 3a, 3b, 4a and 4b are flow charts illustrating methods of generating aural feedback in accordance with two alternate embodiments of the invention.
Figure 3B:
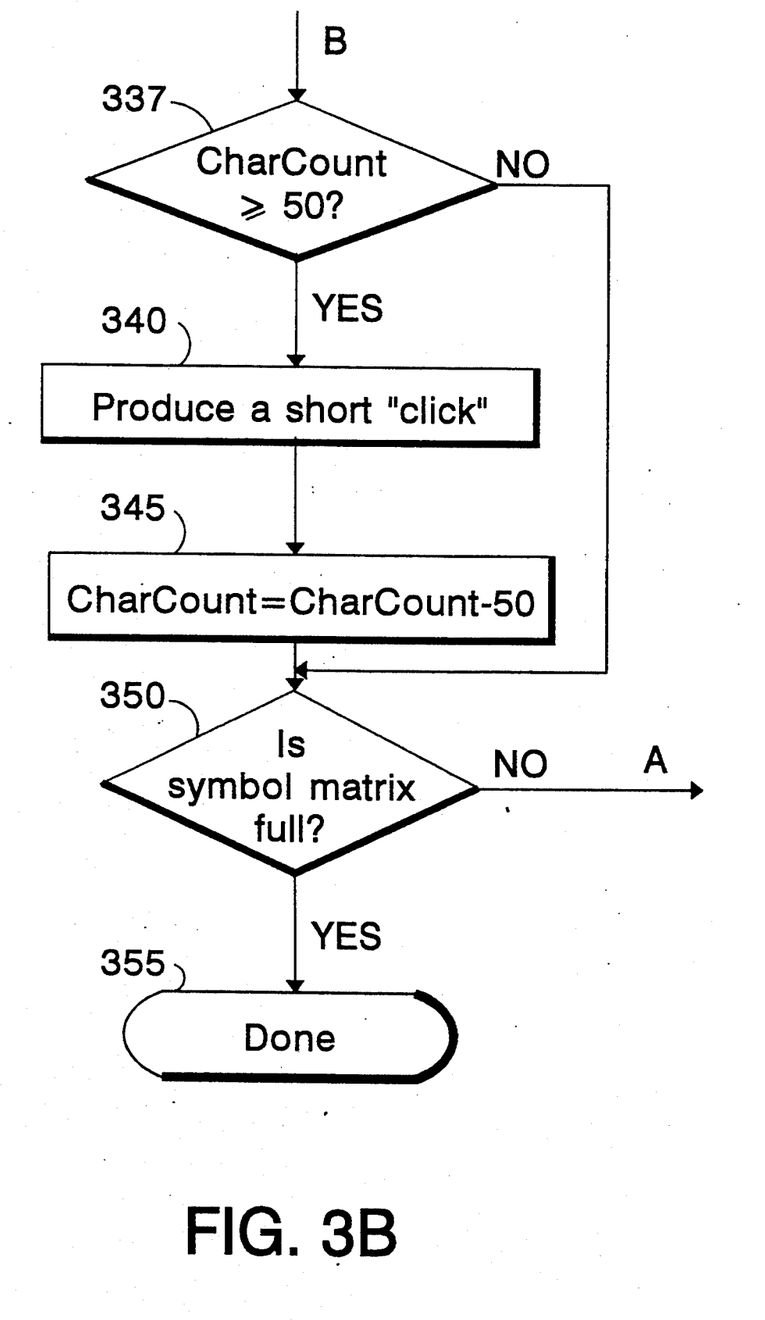

Referring now to FIG. 3, a first alternate embodiment of the invention will now be explained. Steps 305–330 are identical to respective steps 205–230 of the first embodiment. At step 332 a test is made to determine whether the newly decoded character has been previously recognized. This can be done by examining the contents of the character's assigned address in the symbol table with the newly decoded character. The test could also be accomplished by other conventional techniques, such as setting a bit flag for each address in the symbol matrix when it is filled. A character could also be determined to be "new" if its assigned address were already occupied, but the value of the newly decoded and previously decoded characters differed.

If the newly decoded character is determined to be new, then CharCount is incremented at step 335; otherwise it is not incremented.

Another approach to setting the value of CharCount during decoding is the following:

(1) assigning a first value to each newly recognized character;
(2) assigning a second value to each character that was previously recognized in a preceding scan of the indicia;
(3) cumulating the first value into a first sum and cumulating the second value into a second sum;
(4) computing a function of the first sum and the second sum; and
(5) adjusting CharCount according to the value of the computed function.

The value of CharCount is tested at step 337. If the value of CharCount is at least 50, then ON/OFF signal 532 is asserted by the microcomputer 30, enabling an annunciator 530 to emit a short click at step 340. CharCount is decremented by 50 at step 345. As in the case of the preceding embodiment, the constant 50 should be understood to be representative, and it can be varied without departing from the spirit of the invention.

After decrementing CharCount, or in the event that the test at step 337 was negative, whichever may apply, the status of the symbol matrix is tested at step 350. If the symbol matrix is full, then the process is determined to be complete at step 355. Otherwise step 310 is repeated to decode yet another PDF character.

Figure 4A:
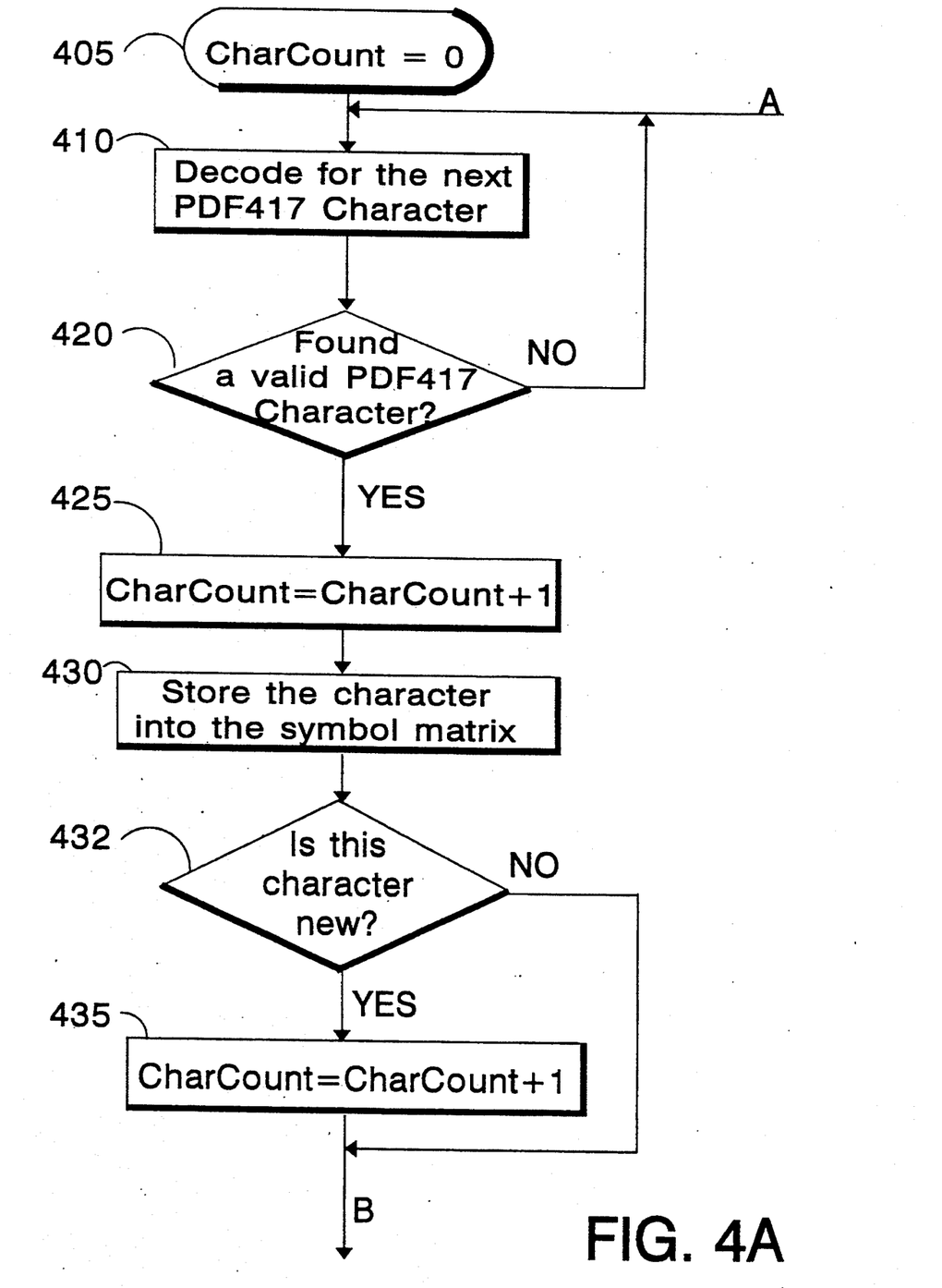
Figure 4B:
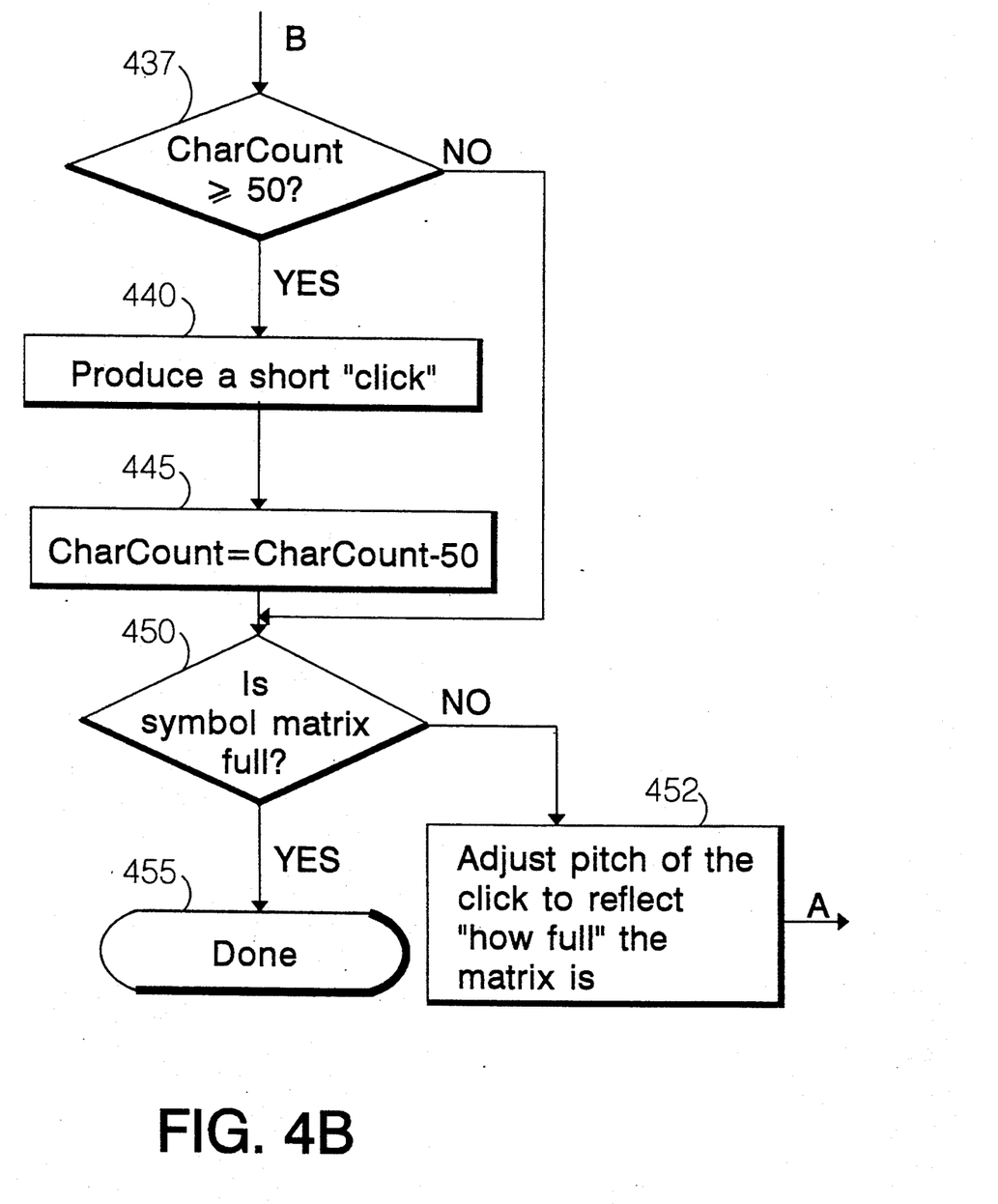
Figure 5:
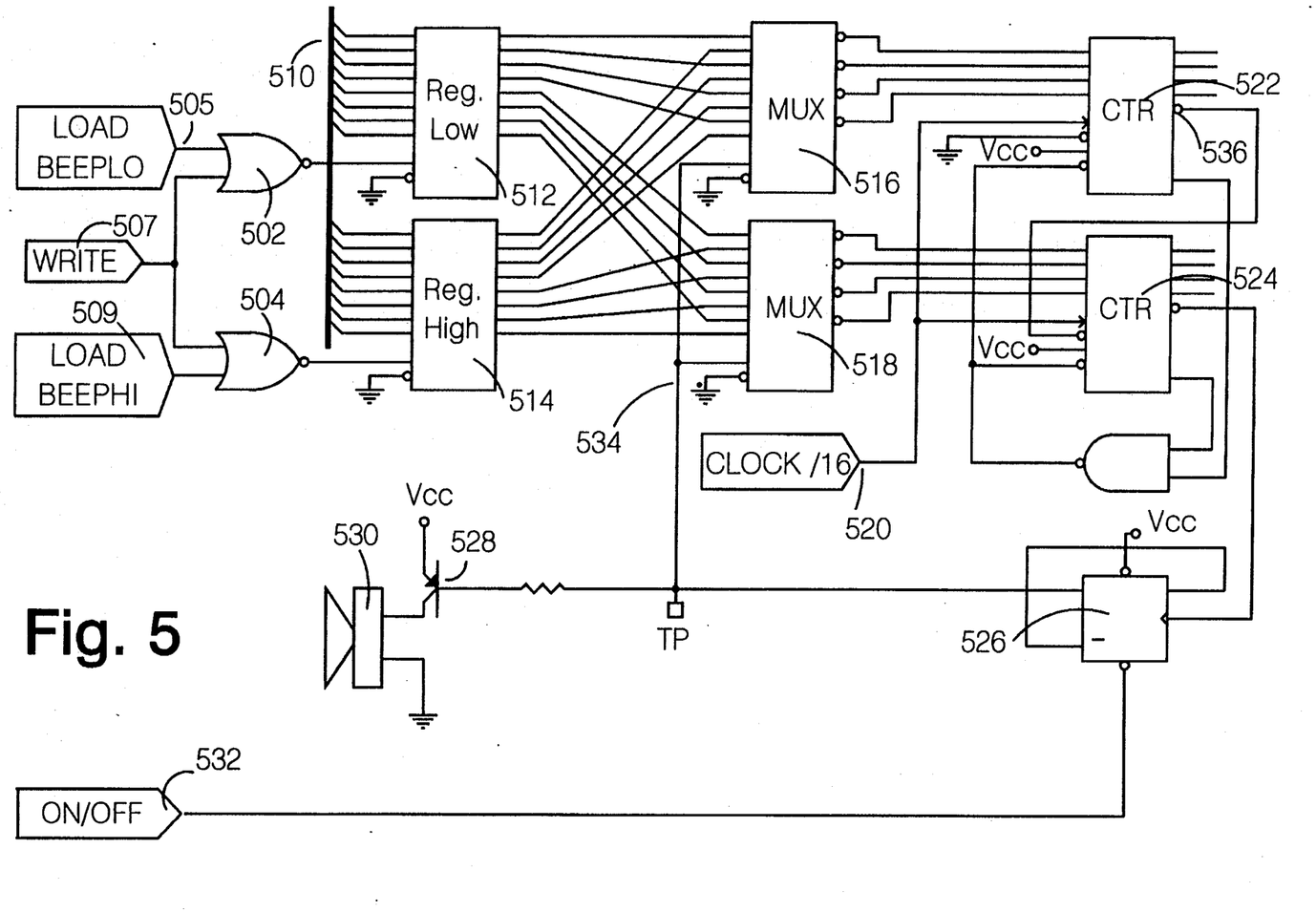
FIG. 5 is a schematic of a circuit suitable for generating audible signals that can be utilized in the system of FIG. 1.

A second alternate embodiment of the invention can be understood with reference to FIGS. 1, 4 and 5. Steps 405–445 are identical to respective steps 305–345 of the first alternate embodiment. At step 450 the status of the symbol matrix is tested, as in step 350 of the preceding embodiment. If the symbol matrix is full, then the process is determined to be complete at step 455. However if still more characters are required to be decoded, then the pitch setting of the click that will be emitted in a subsequent repetition of step 440 is adjusted. As explained above, the microcomputer 30 can determine the total number of characters to be decoded in a PDF417 symbol from information included in the row indicators. Varying the pitch of the sound emitted by the annunciator 530 within an audible range, based on the percentage of the scan completed, informs the operator of the amount of the scan that has been complete, and the amount which remains to be completed. The effect is similar to the perception that occurs when a liquid container is filled. For example, the pitch could be initialized at a relatively low pitch of 3 KHz, and varied up to 6 KHz just before completion of the scan.

In FIG. 5 is shown a square wave generator circuit suitable for controlling the pitch of the annunciator 530. Lines LOAD BEEPLO 505, LOAD BEEPHI 509, WRITE 507, and ON/OFF 532 are coupled to the microcomputer 30, or can be directly connected if a suitable computer architecture is used. In the preferred embodiment, the circuit of FIG. 5 is realized as an oscillator section 57 of the microcomputer 30. The square waves are produced by two four bit counters 522, 524, whose initialized values determine both the frequency of the output waveform, and the duty cycle of the square wave.

When WRITE 507 is asserted, one of storage registers 512, 514 is enabled via a logical network comprising NOR gates 502, 504, according to whether LOADBEEPLO 505 or LOADBEEPHI 509 is low. The WRITE, LOADBEEPLO, AND LOADBEEPHI signals are all active LOW, so that their actions are accomplished by asserting them to logical zero. Thus the NOR gates 502, 504 perform a virtual AND function with respect to these signals. Data from an eight bit bus 510 is latched into the selected register. The high and low nybble of each register are connected respectively to multiplexers 516, 518. The outputs of the multiplexers 516, 518 are connected to 4 bit counters 522 and 524 respectively, and the ripple carry 536 of counter 522 is connected to counter 524. It is apparent that counter 522 is initialized by the low nybble of the data bus 510, and counter 524 is initialized by the high nybble. Under control of a clock 520, which is divided from the output of crystal 59, the combined contents of both counters 522 and 524 determine the duration before producing an output pulse that clocks the D flipflop 526. Unless inhibited by a low level on the ON/OFF input 532, the D flipflop toggles its output upon each clock pulse, and that output switches the multiplexers, causing the counters to reload alternately from the High and Low registers 512,514. The output also is resistance coupled to the base of transistor 528, an amplifier that powers a speaker 530.

Figure 6:
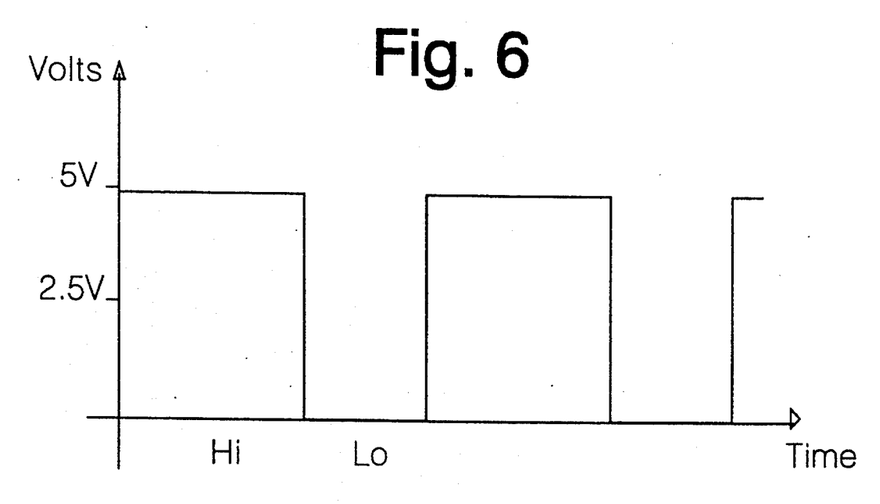
FIG. 6 is a wave form representing an output of the circuit of FIG. 5.

Referring now to FIG. 6 a wave form representing the output of the circuit is shown. The time intervals defining the duty cycle are given as follows:

$$T_{Hi} = \frac{16[\text{Reg High}]}{f}$$

$$T_{Lo} = \frac{16[\text{Reg Low}]}{f}$$

The duty cycle is $$\text{Duty Cycle} = \frac{T_{Lo}}{T_{Hi} + T_{Lo}}$$

and the pitch frequency is given by $$F = \frac{1}{T_{Hi} + T_{Lo}}$$

or $$F = \frac{f}{16[\text{Reg High} + \text{Reg Low}]}$$

wherein
 $T_{Lo}$ is the time interval the signal is low;
 $T_{Hi}$ is the time interval the signal is high;
 f is the crystal frequency;
 F is the frequency of the square wave output;
 Reg low represents the value of the contents of register 512; and
 Reg high represents the value of the contents of register 514.

EXAMPLE 1

The frequency f of crystal 59 is 14.7456 MHz. The counters are clocked at f/16=0.9216 MHz, which corresponds to a clocking period of 1.085 microseconds.

The storage registers 512, 514 are initialized as follows (see FIGS. 5 and 6):

| Reg. Low  | $C6 (198) | $T_{Hi} = $ 215 microseconds |
|-----------|-----------|------------------------------|
| Reg. High | $12 (18)  | $T_{Lo} = $ 20 microseconds  |

The resulting pitch is 4267 Hz, roughly a C#8 musical pitch. The duty cycle (8.5%) is chosen to give a reasonable loudness.

To produce the click, ON/OFF 532 is raised for 200 microseconds, creating an isolated cycle of a square wave.

The pitch can be raised as data is collected by arbitrarily assigning a maximum frequency of 6,583 Hz (Reg. High=128; Reg. Low=12), and loading the registers according to the formulas:

$$\text{Reg High} = 198 - \frac{70C_c}{C_t}$$

$$\text{Reg Low} = 18 - \frac{6C_c}{C_t}$$

wherein:
 Reg high represents the value of the contents of register 512;
 Reg low represents the value of the contents of register 514;
 $C_t$ is the total number of code words in the symbol being scanned; and
 $C_c$ is the number of code words collected and stored in the symbol matrix.

Suitable components for the circuit of FIG. 5 are given in Table 1

TABLE 1

| Storage Registers 512, 514 | 74HC573 |
|----------------------------|---------|
| MUX 516, 518               | 74HC158 |
| Counters 522, 524          | 74HC190 |
| 77Flipflop 526             | 74HC74  |

While this invention has been explained with reference to the structure disclosed herein, it is not confined to the details set forth and this application is intended to cover any modifications and changes as may come within the scope of the following claims.

What is claimed is:

1. A method of reading bar code and graphical indicia of the type having data units encoded therein, comprising the steps of:
 scanning indicia to acquire a representation thereof, wherein said indicia have encoded therein an indicator sufficient to allow a determination of a total number of data units therein;
 decoding data units encoded within the representation; and
 while said step of decoding is being performed:
  determining a quantity of undecoded data elements in the indicia;
  producing an audible indicator having an auxiliary audible characteristic whenever a value that is calculated as a function of a predetermined number of decoded data units has been attained, successive audible indicators defining intervals therebetween; and varying said auxiliary audible characteristic in accordance with said quantity of undecoded data elements;

whereby said audible indicators, said intervals, and said auxiliary audible indicator inform a user of cumulative progress in completing a reading operation.

2. The method according to claim 1, wherein said audible indicator comprises a click.

3. The method according to claim 1, wherein said data units comprise characters.

4. The method according to claim 1, wherein said step of scanning comprises the step of performing repetitive scans of said indicia to obtain successive representations thereof;

said step of decoding comprises the steps of:

decoding data units contained in said successive representations; and assigning each decoded data element to one of a first group comprising data elements that have been decoded from a previous representation, and a second group comprising data elements that have not been decoded from any previous representation;

said function comprises a function of decoded data elements in said first group and of decoded data elements in said second group;

whereby said audible indicators recur at a first rate when previously decoded data elements are decoded and at a second rate when previously undecoded data elements are being decoded.

5. The method in accordance with claim 1, wherein said auxiliary audible characteristic comprises a pitch.

6. A method of reading graphical indicia that are encoded in accordance with a multidimensional symbology, said symbology having code words defined therein, comprising the steps of:

repeatedly scanning indicia to produce a signal representative of a pattern thereof at least until sufficient information is recognized to assure a valid reading operation;

decoding the signal to obtain character information from code words of the indicia; and while said step of decoding is being performed, assigning a first value to each newly recognized character;

assigning a second value to each character that was recognized in a preceding scan of the indicia;

cumulating said first value into a first sum and cumulating said second value into a second sum;

computing a function of said first sum and said second sum;

producing an audible click whenever a predetermined value of said function has been attained;

resetting said first sum and said second sum;

whereby successive clicks inform a user of a rate of progress in completing a reading operation.

7. The method in accordance with claim 6, wherein the symbology has an indicator of a total number of code words in the indicia, further comprising the steps of:

determining a total number of code words in the indicia being scanned; and while said step of decoding is being performed, determining a quantity of undecoded code words in the indicia; and producing an audible indicator having a characteristic indicative of said quantity of undecoded code words.

* * * * *